United States Patent

[11] 3,574,461

[72] Inventors John F. Yurasek
 Passaic;
 Arthur Simon, Fair Lawn, N.J.
[21] Appl. No. 763,865
[22] Filed Sept. 30, 1968
[45] Patented Apr. 13, 1971
[73] Assignee The Bendix Corporation

[54] RANGE DISPLAY SYSTEM
 10 Claims, 7 Drawing Figs.
[52] U.S. Cl. .................................................... 356/5,
 343/13, 343/14, 356/4
[51] Int. Cl. .................................................... G01c 3/08
[50] Field of Search .......................................... 343/13, 14;
 356/4, 5

[56] References Cited
UNITED STATES PATENTS
3,196,435 7/1965 Chambers .................. 343/14X
3,350,711 10/1967 Cartwright ................. 343/13X
3,409,368 11/1968 Fernandez .................. 356/5

Primary Examiner—Rodney D. Bennett, Jr.
Assistant Examiner—Joseph G. Baxter
Attorneys—Anthony F. Cuoco and Plante, Hartz, Smith and Thompson ABSTRACT: A system for converting the interval between signals fired at a target and corresponding rebound signals therefrom to a full scale target range indication and to an expanded scale indication showing target range to a preset range point, and including noise reduction and range rate augmentation means for increased accuracy.

INVENTORS
JOHN F. YURASEK
ARTHUR SIMON

ATTORNEY

INVENTORS
JOHN F. YURASEK
ARTHUR SIMON

RANGE DISPLAY SYSTEM

CROSS REFERENCE TO RELATED APPLICATIONS

The system of the present invention uses electronic switching means such as disclosed and claimed in copending U.S. application, Ser. No. 737,524 filed Jun. 17, 1968, now Pat. No. 3,471,742, by Kenneth J. Kendall, and John F. Yurasek and assigned to The Bendix Corporation, assignee of the present invention.

BACKGROUND OF THE INVENTION

1. Field of the Invention

This invention relates to systems for indicating target range and, more particularly, to systems of the type described using signals fired at a target and corresponding rebound signals such as may be provided, for example, when a laser device is used for aircraft navigation or ballistics purposes.

2. Description of the Prior Art

Heretofore, systems using signals fired at a target and corresponding rebound signals for providing aircraft navigation and weapons release data have not had the high degree of accuracy required for modern high-speed military and commercial craft. This has been particularly true when dealing with relatively short target ranges. Electrical noise has been a contributing factor in decreasing this accuracy.

SUMMARY OF THE INVENTION

The system of the present invention includes an integrator for converting the interval between signals fired at a target and corresponding rebound signals into a ramp output proportional to target range and a pair of sample and hold circuits for sampling the ramp output and storing it during the interval between firings. The output of the second sample and hold circuit is displayed on a pair of meters. One meter indicates full scale range and the other meter indicates an expanded scale range showing target range to a preset range point. Means are provided for reducing the signal-to-noise ratio and for providing range rate augmentation to increase the accuracy of the system.

One object of this invention is to provide a system for converting the interval between signals fired at a target and corresponding rebound signals to a target range display.

Another object of this invention is to provide a system of the type described which is accurate for relatively short ranges.

Another object of this invention is to display full scale range and expanded scale range to a preset range point.

Another object of this invention is to provide means for improving signal-to-noise ratio to reduce system degradation due to high amplitude noise.

Another object of this invention is to provide means for updating and smoothing range data during the interval between the firing and return signals to increase system accuracy.

Another object of this invention to to provide range rate data augmentation using aircraft airspeed or acceleration.

Another object of this invention it to provide range rate data augmentation by use of internal data smoothing.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be considered as defining the limits of the invention. For example, although the invention is described as using a laser device, any other device providing signals for firing at a target may be used as well.

DESCRIPTION OF THE INVENTION

Figure 1:
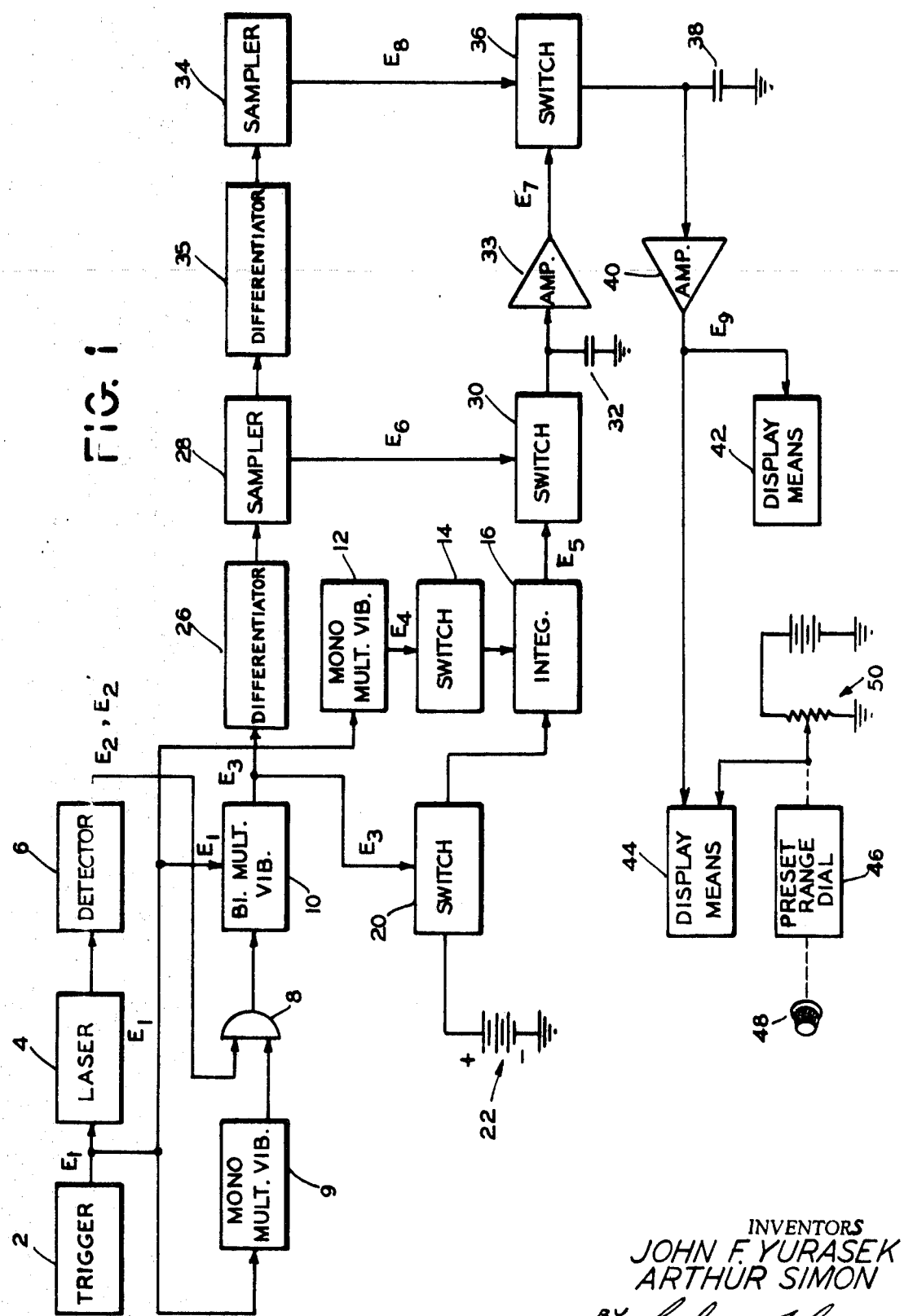
FIG. 1 is a block diagram of the system of the present invention.
Figure 2:
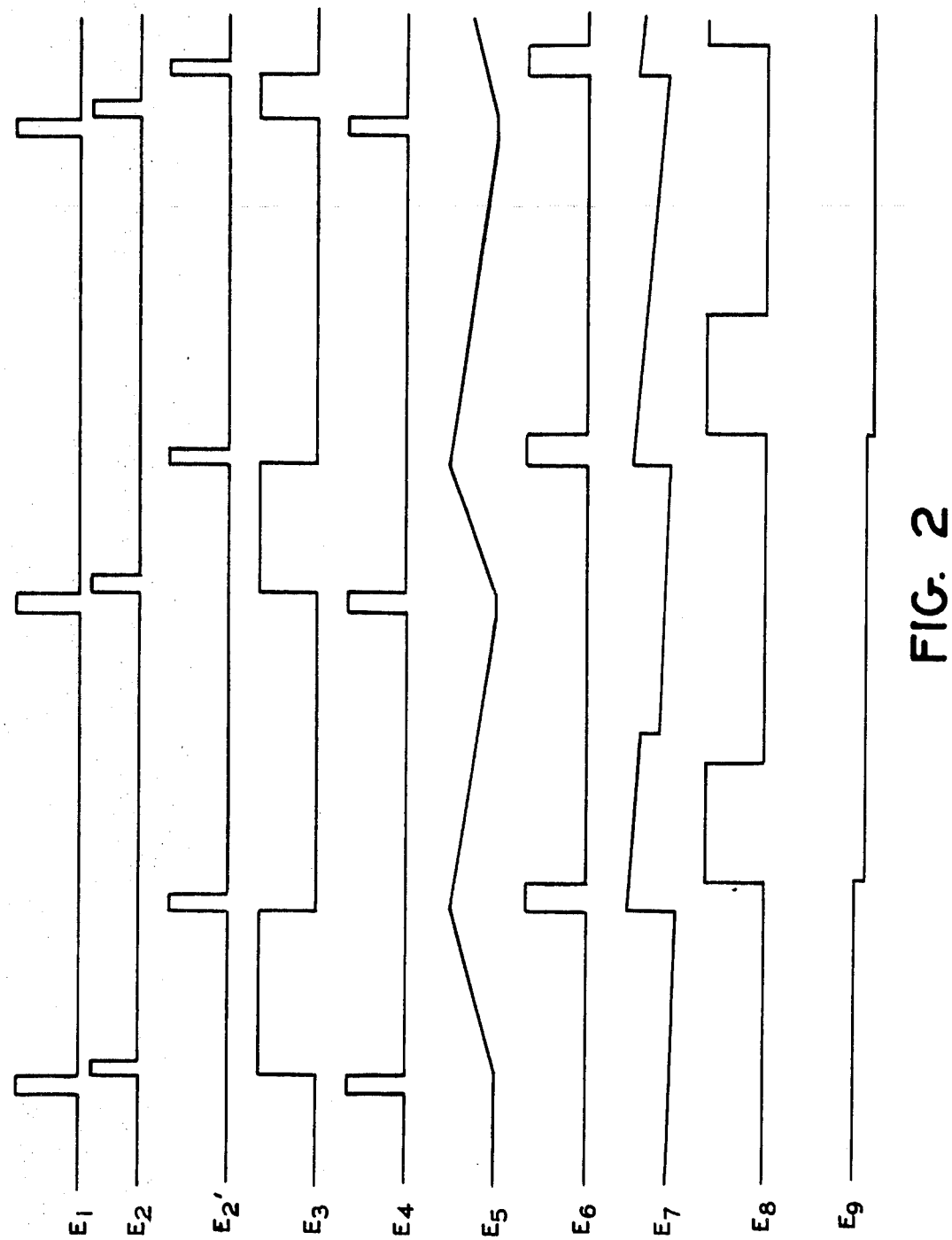
FIG. 2 is a graphical representation showing pulse waveforms provided at various stages of operation of the system shown in FIG. 1.

With reference to FIG. 1, a trigger 2 which may be, for purposes of example, a unijunction transistor oscillator operating at an adjustable frequency of 1 to 4 cycles per second, provides a basic system timing pulse $E_1$ having a waveform as shown in the graphical representation of FIG. 2.

Pulse $E_1$ is applied to a laser device 4 which is mounted on an aircraft and boresighted with the longitudinal axis of the craft for aiming at a predetermined target. It is desired to determine the range of the target for navigation or ballistics purposes.

Several microseconds after laser device 4 receives pulse $E_1$, the laser device fires and a sample of the firing energy is sensed by a photodetector 6 which may be, for purposes of example, a solid-state photodiode or a photomultiplier tube for providing a laser firing pulse $E_2$ having a waveform as shown in FIG. 2. The laser energy strikes the predetermined target and rebounds therefrom so that several microseconds later the laser return energy is sensed by photodetector 6 for providing a rebound pulse $E'_2$ having a waveform as shown in FIG. 2.

Laser firing pulse $E_2$ and rebound pulse $E'_2$ are applied to a coincidence gate 8 and pulse $E_1$ from trigger 2 is applied to a monostable multivibrator 9 for providing a pulse which is applied to gate 8. When firing pulse $E_2$ coincides with the pulse from multivibrator 9, gate 8 provides a pulse for enabling a bistable multivibrator 10, and when rebound pulse $E'_2$ coincides with the pulse from multivibrator 9, gate 8 provides a pulse for disabling multivibrator 10. Multivibrator 10 thus provides a pulse $E_3$ having a waveform as shown in FIG. 2, and since pulse $E_3$ is provided as a function of pulses $E_2$ and $E'_2$, the width of pulse $E_3$ is a measure of target range.

Pulse $E_1$ from trigger 2 is applied to multivibrator 10 to reset multivibrator 10 and is applied to a monostable multivibrator 12 to reset multivibrator 12. Multivibrator 12 provides a pulse $E_4$ having a waveform as shown in FIG. 2, and which pulse $E_4$ is applied to a switch 14 for closing switch 14 to thereby set and reset an integrator 16 to zero.

Pulse $E_3$ from multivibrator 10 is applied to a switch 20 for closing switch 20 thereby applying a reference voltage from a suitable source of direct current such as a battery 22 to integrator 16. Integrator 16 provides a pulse $E_5$ which increases linearly to the level of the reference voltage from battery 22, and which pulse $e_5$ is proportional to the width of pulse $e_3$ from multivibrator 10 and thus proportional to target range.

Pulse $E_3$ from multivibrator 10 is applied through a differentiator 26, and which differentiator 26 provides a pulse at the end of pulse $E_3$, to a sampler 28 which may be, for purposes of example, a 500 ω second monostable multivibrator. The negative going edge of pulse $E_3$, provided when multivibrator 10 is disabled by the output of gate 18 as heretofore explained, enables sampler 28 for providing a pulse $E_6$ having a waveform as shown in FIG. 2. Pulse $E_6$ is applied to a switch 30 connected to integrator 16 for closing switch 30 thereby applying the output of integrator 16 proportional to range to a storage capacitor 32 connected intermediate switch 30 and a voltage follower amplifier 33.

In this connection it is to be noted that the value of storage capacitor 32 is determined by a tradeoff between the storage capacitor rise time and the capacitor leakage time constant. A small capacitance value is indicated to permit capacitor 32 to quickly charge to the level of integrator output pulse $E_5$, while a large capacitance value is necessary to minimize capacitor leakage during the interval between laser firing and rebound pulses $E_2$ and $E'_2$, respectively. Voltage follower amplifier 33, coupled to switch 30 through capacitor 32, as heretofore noted, provides a pulse $E_7$ having a waveform as shown in FIG. 2, and which pulse $E_7$ is applied to a switch 36.

In order to improve accuracy, another sampler 34 is added, and which sampler 34 is similar to sampler 28 and is coupled thereto through a differentiator 35. Sampler 34 provides a pulse $E_8$ having a waveform as shown in Fig. 2, and which pulse $E_8$ is applied to switch 36 for closing switch 36, thereupon applying pulse $E_7$ from voltage follower 33 to a storage capacitor 38. It is to be noted that the value of capacitor 38 may be 100 times the value of capacitor 32. Thus, the larger capacitor 38, for the same leakage current, will hold the output of switch 36 100 times longer. Also, capacitor 38 is charged for an interval 100 times greater than the charging interval for capacitor 32 in order to limit the peak current required from voltage follower amplifier 33. As may be seen from the graphical representation of FIG. 2, the timing scheme for sampler 34 is the same as that for sampler 28, except that the switching function is delayed until the charge on capacitor 32 has reached equilibrium.

A voltage follower amplifier 40, coupled to switch 36 through capacitor 38, provides a signal $E_9$ having a waveform as shown in FIG. 2. Signal $E_9$ is applied to a display means 42 which may be a meter indicating full scale range. Signal $E_9$ is applied to a display means 44 which may be a meter having an expanded scale and indicating range to a present target. The preset range is introduced into the system through a range dial which may be manually operated by a knob 48 connected by suitable mechanical means to a potentiometer 50. Potentiometer 50 provides a voltage proportional to preset range, and which voltage is applied to display means 44 and subtracted thereby from signal $E_9$ corresponding to actual range so as to provide an indication of range to the present target. The accuracy of the device of the present invention is such that the preset range scale may be expanded by a factor of 10 and still present target to preset range data accurate to 1 percent.

Figure 3:
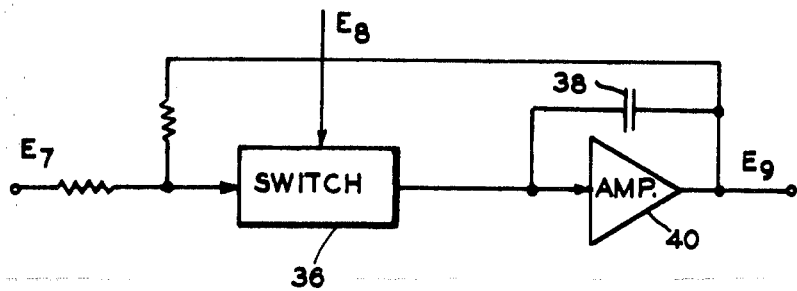
FIG. 3 is an electrical schematic diagram showing a hold circuit which may be used in the system of the present invention.

An alternate approach to the sample and hold problem herein presented involves connecting capacitor 38 across amplifier 40 in integrator fashion as shown in FIG. 3. When switch 36 is closed by pulse $E_8$ from sampler 34, amplifier 40 and capacitor 38 function as a quasi-integrator or lag-type circuit having the same disadvantages as previously discussed; that is, it is desirable to have the value of capacitor 38 large for leakage considerations but small to permit the required fast charging capability.

Figure 4:
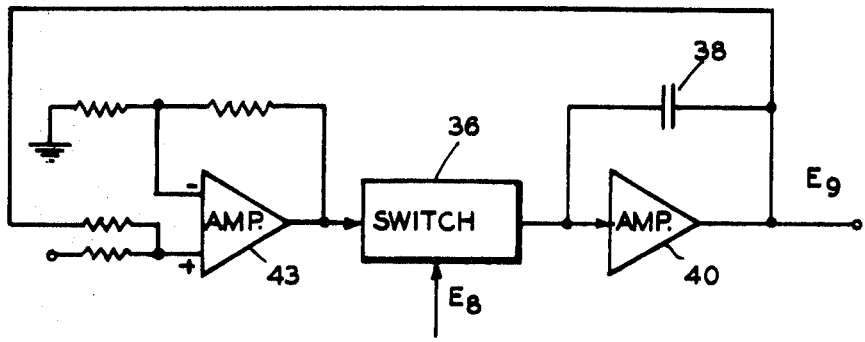
FIG. 4 is an electrical schematic diagram showing an improvement over the hold circuit of FIG. 3.

This problem may be overcome by employing a circuit configuration such as that shown in FIG. 4, and wherein an additional amplifier 43 is included and operated as a noninverting unity gain amplifier in the feedback loop of amplifier 40. Operational amplifier 43 may be chosen so that the leakage characteristics are equivalent to that of the circuit shown in FIG. 3. Since, however, a large capacitor (0.4 $\omega f$, for example) can be charged with one or more complex hold circuit, the hold circuit of FIG. 3 can possibly be eliminated as will now be evident to those skilled in the art.

The system's active duty cycle i.e., the ratio of the time during which usable information is expected to the period between the laser firing and rebound pulses $E_2$ and $E'_2$, respectively is extremely low. For example, for a maximum target detection range of 20,000 feet and a laser pulsing rate of 4 cycles per second, the active duty cycle is 40 microseconds divided by 250,000 microseconds or approximately 1 part in 6,000. Range gating in such a situation is indicated and easily instrumented by inhibiting bistable multivibrator 10 during all but, for example, a 100 microsecond interval around the laser firing time as may be seen from the graphical representation of FIG. 2. This range gating is achieved by applying trigger pulse $E_1$ from trigger 2 to monostable multivibrator 9, and which monostable multivibrator 9 provides a pulse which is applied to gate 8 to enable and disable monostable multivibrator 10 as heretofore described. It should be noted that in actual application this range-gating scheme provides an effective signal-to-noise ratio improvement of greater than 60 db. This improvement is especially important in reducing system degradation due to occasional high-amplitude noise spikes characteristic of photomultiplier tubes employing IR-sensitive phosphors.

The system described samples target range date at a rate of, for example, 4 cycles per second, and holds this information for the rather long interval of about 0.25 seconds between the laser firing and return pulses $E_2$ and $E'_2$, respectively. Accordingly, some updating and data smoothing of the range data during this interval is desirable. Apparatus for accomplishing this falls in two general categories: (a) external range rate augmentation as shown in FIGS. 5 and 6; and (b) internal range rate augmentation as shown in FIG. 7.

Figure 5:
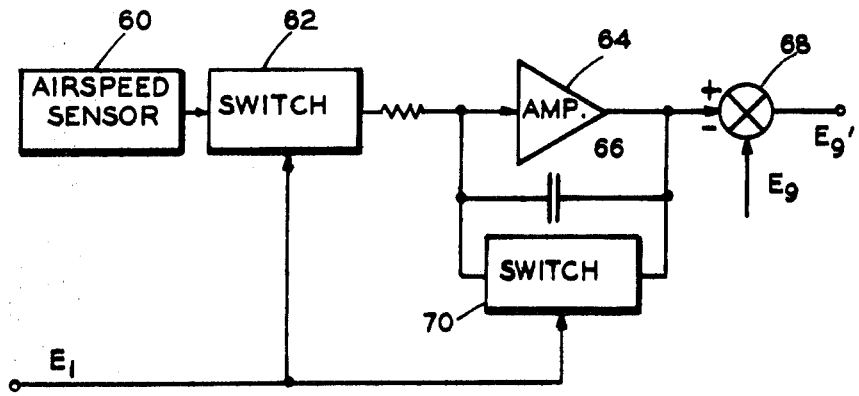
FIG. 5 is an electrical schematic diagram showing means for providing range rate data augmentation using airspeed as an input.

With reference then to FIG. 5, an airspeed sensor 60 provides an airspeed signal which is applied through a switch 62 such as described and claimed in the aforenoted U.S. application Ser. No. 737,524 and which switch 62 is closed by pulse $E_1$ from trigger 2, to an amplifier 64 having a capacitor 66 connected in feedback configuration thereto. The airspeed signal is integrated to provide a ramp voltage corresponding to range at the output of amplifier 64, and which ramp voltage is algebraically summed with signal $E_9$ from amplifier 40 (FIG. 1) by a summing means 68 to provide an overall smoothed signal $E'_9$ to display means 42 and 44 shown in FIG. 1. The integrator including amplifier 64 is set and reset by a switch 70 which is similar to switch 62 and is operated by signal $E_1$ from trigger 2.

Figure 6:
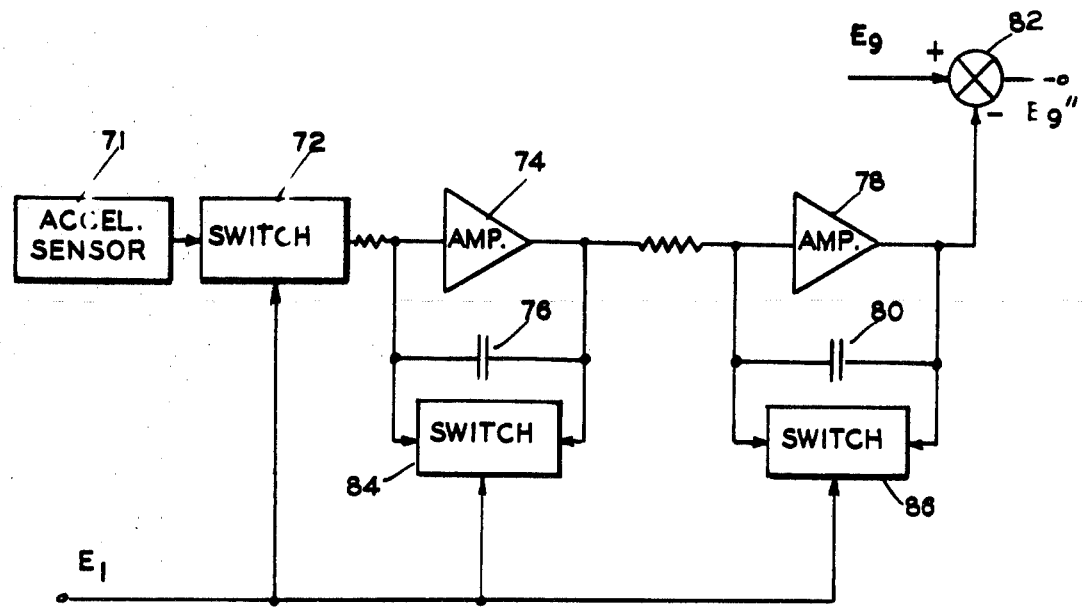
FIG. 6 is an electrical schematic diagram showing means for providing external range rate data augmentation using acceleration as an input.

With reference to FIG. 6, an acceleration sensor 71 provides an aircraft acceleration signal which is applied through a switch 72, and which switch 72 is similar to switches 62 and 70 and is closed by signal $E_1$ from trigger 2, to an amplifier 74 having a capacitor 76 connected in feedback relation thereto. The acceleration signal is thus integrated and the integrated signal is applied to an amplifier 78 having a capacitor 80 connected in feedback relation thereto so as to perform another integration. Amplifier 78 thus provides a ramp voltage corresponding to range, and which ramp voltage is algebraically summed with signal $E_9$ by a summing means 82 to provide an overall smoothed signal $E''_9$ to display means 42 and 44. The integrators including amplifiers 74 and 78 are set and reset by switches 84 and 86, respectively, which are similar to switches 62, 70 and 72 actuated by signal $E_1$ from trigger 2.

Figure 7:
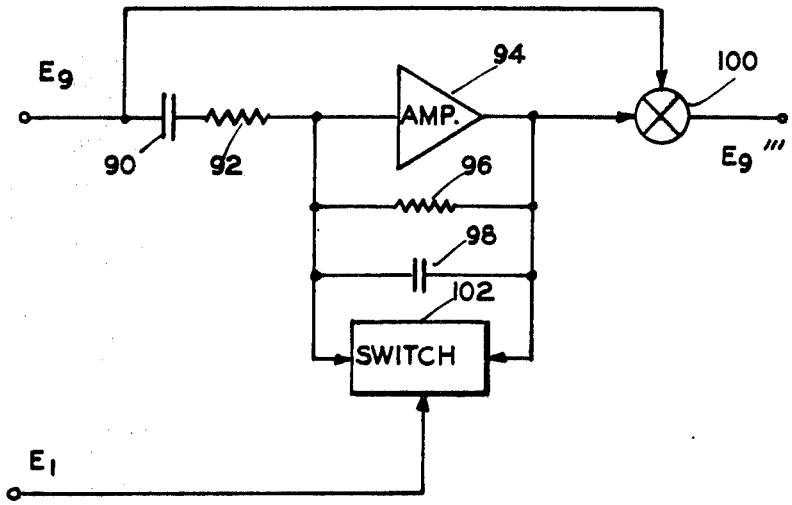
FIG. 7 is an electrical schematic diagram showing means for providing internal range rate data augmentation.

Internal range rate augmentation is provided by performing a quasi-differentiation/integration on signal $E_9$ as shown in FIG. 7. Signal $E_9$ is applied through a capacitor 90 and a resistor 92 to an amplifier 94 having a resistor 96 connected in a first feedback loop and a capacitor 98 connected in a second feedback loop.

Amplifier 94 generates a sawtooth type output (actually the most linear part of an exponential) having an amplitude proportional to the sample-to-sample change in range as the target is approached. This output is algebraically summed with signal $E_9$ by a summing means 100 to provide a signal $E'''_9$, and which signal $E'''_9$ is applied to display means 42 and 44. The differentiator/integrator including amplifier 94 is set and reset by a switch 102 similar to the aforementioned switches and actuated by signal $E_1$ from trigger 2.

It may be seen from the foregoing description that the present invention provides a high accurate range computer. Range gating provides noise immunization and preset range data is introduced into the display means. The use of dual cascaded sample and hold circuits increases the hold-to-sample ratio thereby improving the overall accuracy of the system. Additionally, for still greater accuracy, range rate augmentation is provided by using airspeed or acceleration data or by using internal data smoothing.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. A range display system for an aircraft, comprising:
   means for providing signals corresponding to the interval between signals transmitted to a target and corresponding rebound signals from the target, said provided signals corresponding to target range;
   means connected to said means for sampling the signals therefrom and for storing the sampled signals during the interval between transmitted signals;
   means for updating the stored signal during the interval between transmitted signals and including means for providing an airspeed signal and an integrator for integrating the airspeed signal; and
   means connected to the sampling and storing means and to the integrator in the updating means, and responsive to the signals therefrom for displaying target range.

2. A system as described by claim 1, wherein the means for providing signals corresponding to the interval between signals transmitted to a target and corresponding rebound signals from the target, said provided signals corresponding to target range, includes:
   means for providing a trigger signal;
   a first oscillator connected to the trigger signals means and responsive to the signal therefrom, and responsive to the transmitted and rebound signals for providing a first pulse;
   a second oscillator connected to the trigger signals means and responsive to the signal therefrom for providing a second pulse;
   means for providing a reference voltage;
   an integrator;
   a normally open first switch connected to the reference voltage means, to the first oscillator and to the integrator, and closed by the first pulse for applying the reference voltage to the integrator; and
   a normally open second switch connected to the second oscillator and to the integrator and closed by the second pulse for setting the integrator whereupon the integrator provides an output which increases to the level of the reference voltage, said integrator output being a function of the first pulse and corresponding to target range.

3. A system as described by claim 2, wherein the first oscillator includes:
   a first multivibrator connected to the trigger means and responsive to the pulse therefrom for providing a third pulse;
   a second multivibrator connected to the trigger means for being set in response to the pulse therefrom and providing the first pulse; and
   gating means connected to the first multivibrator and to the second multivibrator and responsive to the third pulse, and responsive to the transmitted signal and the rebound signal for enabling the second multivibrator to provide the first pulse when the transmitted signal coincides with the third pulse and for disabling the second multivibrator when the rebound pulse coincides with the third pulse.

4. A system as described by claim 3, wherein the sampling and storing means includes:
   a first differentiator connected to the second multivibrator for providing a first differentiated pulse in response to the first pulse;
   a first sampler connected to the first differentiator for providing a first sample pulse;
   first storage means;
   a normally open third switch connected to the integrator, the first sampler and the storage means, and closed by the first sample pulse for applying the integrator output to the first storage means;
   a second differentiator connected to the first sampler for providing a second differentiated pulse in response to the first sample pulse;
   a second sampler connected to the second differentiator for providing a second sample pulse;
   second storage means;
   a normally open fourth switch connected to the first storage means, the second sampler and the second storage means, and closed by the second sample pulse so as to apply the output of the first storage means to the second storage means; and
   the display means being connected to the second storage means.

5. A system as described by claim 4, wherein:
   the first storage means includes a capacitor having a predetermined capacitance connected to the third switch, a voltage follower is connected to the capacitor and the fourth switch is connected to the voltage follower;
   the second storage means includes another capacitor having a capacitance substantially greater than that of the first capacitor and connected to the fourth switch, another voltage follower is connected to the other capacitor; and
   the display means is connected to the other voltage follower.

6. A system as described by claim 5, wherein:
   the other capacitor is connected in one feedback path to the other voltage follower; and
   the fourth switch is connected in another feedback path to the other voltage follower.

7. A system as described by claim 5, wherein:
   a unity gain noninverting amplifier and the fourth switch are connected in one feedback path to the other voltage follower; and
   the other capacitor is connected in another feedback path to the other voltage follower.

8. A system as described by claim 1, including:
   means for providing a signal corresponding to a predetermined point; and
   means connected to the sampling and storing means, to the integrator in the updating means and to the last mentioned means, and responsive to the signals therefrom for displaying target range to the predetermined point.

9. A range display system for an aircraft, comprising:
   means for providing signals corresponding to the interval between signals transmitted to a target and corresponding rebound signals from the target, said provided signals corresponding to target range;
   means connected to said means for sampling the signals therefrom and for storing the sampled signals during the interval between transmitted signals;
   means for updating the stored signal during the interval between transmitted signals and including means for providing an aircraft acceleration signal, an integrator for integrating the acceleration signal and another integrator for integrating the integrated acceleration signal; and
   means connected to the sampling and storing means and to the other integrator in the updating means, and responsive to the signals therefrom for displaying target range.

10. A system as described by claim 9, including:
    means for providing a signal corresponding to a predetermined point; and
    means connected to the sampling and storing means, to the other integrator in the updating means and to the last mentioned means, and responsive to the signals therefrom for displaying target range to the predetermined point.